United States Patent [19]

Hiron et al.

[11] Patent Number: 5,736,650

[45] Date of Patent: Apr. 7, 1998

[54] VENTURI FLOW METER FOR MEASUREMENT IN A FLUID FLOW PASSAGE

[75] Inventors: Stephane Hiron; Eric Donzier, both of Paris; Fachel Rezgui, Sceaux, all of France

[73] Assignee: Schlumberger Technology Corp., Houston, Tex.

[21] Appl. No.: 663,342

[22] Filed: Jun. 13, 1996

[30] Foreign Application Priority Data

Jun. 15, 1995 [FR] France .................. 95 07152

[51] Int. Cl.⁶ .................................................. G01F 1/44
[52] U.S. Cl. ............................. 73/861.63; 73/861.04
[58] Field of Search ................. 73/861.63, 861.04, 73/861.64

[56] References Cited

U.S. PATENT DOCUMENTS

| | | | |
|---|---|---|---|
| 2,023,568 | 12/1935 | Albersheim et al. | 73/861.63 |
| 4,397,190 | 8/1983 | Hulin . | |
| 4,651,572 | 3/1987 | Albertz et al. | 73/861.63 |
| 4,829,831 | 5/1989 | Kefer et al. . | |
| 4,856,344 | 8/1989 | Hunt | 73/861.63 |
| 5,423,226 | 6/1995 | Hunter et al. | 73/861.63 |
| 5,591,922 | 1/1997 | Segeral et al. | 73/861.04 |

FOREIGN PATENT DOCUMENTS

| | | |
|---|---|---|
| 234747 | 9/1987 | European Pat. Off. . |
| 2263172 | 7/1993 | United Kingdom . |
| 9317305 | 9/1993 | WIPO . |

*Primary Examiner*—Richard Chilcot
*Assistant Examiner*—Jewe V. Artis
*Attorney, Agent, or Firm*—John J. Ryberg

[57] ABSTRACT

The invention relates to a device for measuring the flow rate Q of a fluid in a fluid passage, in a well, the device comprising a first venturi section and first means responsive to the pressure difference $\Delta P_1$ across the first venturi section between two points that are separate from each other in the flow direction. It comprises a second venturi section, and second means responsive to the pressure difference $\Delta P_2$ across the second venturi section between two points that are separate in the flow direction, the two venturi sections being disposed relative to each other in such a manner that for a given direction of fluid flow, the diameter of one of them increases whereas the diameter to the other one of them decreases, said venturi sections being further arranged in such a way that the static pressure components present in said pressure differences $\Delta P_1$ and $\Delta P_2$ can be cancelled out.

20 Claims, 2 Drawing Sheets

VENTURI FLOW METER FOR MEASUREMENT IN A FLUID FLOW PASSAGE

BACKGROUND OF THE INVENTION

1. Field of the Invention

The invention relates to a device for measuring the flow rate of a fluid in a passage, in particular in a hydrocarbon well.

2. Description of Prior Art

A device known in the prior art is described in document EP-A-234 747. Such a device is shown in FIG. 1 and it essentially comprises a first section 1 of a passage that is of uniform diameter followed by a second section 2 that is of tapering diameter so as to form a venturi. Three pressure take-off points 3, 4, and 5 are provided, the point 4 being situated at the inlet to the venturi, the point 3 upstream from the point 4, and the point 5 downstream from the venturi. The flow direction of the fluid is marked by the arrow given reference 6. A first differential pressure measurement $\Delta P_m$ can be obtained between points 3 and 4, at the ends of constant diameter section 1. This differential pressure $\Delta P_m$ serves to determine the mean density of the flowing fluid. A second differential pressure measurement $\Delta P_v$ can be performed between points 4 and 5, i.e. across the venturi. This measurement serves to determine the flow rate of the fluid, providing the density thereof has previously been determined by measuring $\Delta P_m$. More precisely, the flow rate v can be calculated using the relationship:

$$\Delta P_v = a\rho v^2 + b(\rho_o - \rho)$$

where $\rho$ is the density of the fluid and $\rho_o$ corresponds to the density of a fluid present in the measurement circuit of the differential pressure sensors. The coefficient a is equal to $\frac{1}{2}(1-d^4/D^4)$, where d and D are respectively the diameter of the smallest section and the diameter of the largest section of the venturi.

This relationship shows that the measured differential pressure is the sum of two terms, one of which is proportional to the square of the flow rate while the other (the static component) is independent of flow rate. Consequently, when the flow rate is small, the static component predominates, such that the slightest error in determining density gives rise immediately to an apparent flow rate. The use of two differential pressure sensors, typically having an accuracy of 15 mpsi ($10^{-3}$ bar), can generate apparent flow rates of the order of 1,000 barrels/day (bpd) (i.e. 6.6 cubic meters per hour ($m^3/h$)), and this can happen even when there is no fluid flowing in the passage. This is shown in FIG. 2 which, for two different densities (I: 1250 $kg/m^3$, II: 500 $kg/m^3$) shows how the two components of the differential pressure vary as a function of flow rate: one of these components depends on flow rate while the other component (the static component) is independent thereof. From this graph, it can be seen that the static component is largely predominant for flow rates of less than about 600 bpd (3.96 $m^3/h$). Up to 2,000 bpd (13.2 $m^3/h$), the differential pressure measurement, and consequently the flow rate measurement, is highly sensitive to the static component.

In addition, the known device relies, as do all other systems using venturis, on a reduction in the diameter of the passage or channel in which the fluid is flowing. Nevertheless, the flow rate to be measured is the flow rate in the portion of the passage having diameter d, i.e. in the normal section of the venturi. When subjecting wells to testing for hydrocarbon extraction (drill stem testing or "DST"), standard values need to be satisfied with respect to production tubing, i.e. the diameter d: this value is set to 2½" (57.15 mm). Consequently, the only way of achieving a restriction in order to form a venturi is to begin by enlarging the inside diameter of the tubing to a diameter D and subsequently to return it to its standard diameter d. This has the consequence that in the above expression for $\Delta P_v$, the term v is subjected to a coefficient of $(1-d^4/D^4)$ of less than 1. Thus, where d=2¼" (57.15 mm) and D=3" (76.2 mm), the term $v^2$ is subjected to an attenuation coefficient of about 0.3. Consequently, the sensitivity of $\Delta P_v$ to measured flow rate is small, particularly when the flow rate is small. Typically, for a flow rate of the order of 1,000 bpd (6.6 $m^3/h$), an error of 30% is common, and the error on flow rates of the order of 600 bpd (3.96 $m^3/h$) can be as much as 50% to 60%. Errors of less than 5% are obtained only at flow rates greater than about 5,000 bpd (33 $m^3/h$).

Consequently, the known device is subject to two main sources of error: one is associated with the fact that attempts are made to measure flow rate in the small section of a venturi whose diameter cannot be reduced to less than the nominal value of d=2¼" (57.15 mm); and the other is associated with the static component that is independent of flow rate.

SUMMARY OF THE INVENTION

The present invention provides a device for measuring the flow rate Q of a fluid in a fluid passage, in a well, the device comprising a first venturi section and first means responsive to the pressure difference $\Delta P_1$ across the first venturi section between two points that are separate from each other in the flow direction, a second venturi section, and second means responsive to the pressure difference $\Delta P_2$ across the second venturi section between two points that are separate in the flow direction, the two venturi sections being disposed relative to each other in such a manner that for a given direction of fluid flow, the diameter of one of them increases whereas the diameter of the other one of them decreases, said venturi sections being further arranged in such a way that the static pressure components present in said pressure differences $\Delta P_1$ and $\Delta P_2$ can be cancelled out.

Such a measurement device makes it possible:

- to eliminate the presence of the interfering static component, completely; and
- to reduce the error in the measured flow rate, substantially: for a given flow rate, error values can be obtained that are five to ten times smaller than with the prior art device.

The distances between the two pressure take-off points of the two venturis are preferably equal. The same applies to the normal sections (and indeed the large sections of the venturis).

In a particular embodiment, the first and second venturi sections may each be constituted by a locally thicker portion of the wall delimiting the outside of the passage.

In an apparatus of the present invention, the most accurate determination of flow rate is nevertheless obtained at the cost of a small amount of loss in accuracy concerning density at high flow rates. However, this can be compensated by adding a pressure difference measurement in a straight portion of the passage. Under such circumstances, excellent density measurement is achieved while simultaneously obtaining very good flow rate measurement.

The two venturi sections may be fixed in a string of production test rods, and recording means may also be provided in the string of rods so as to record signals representative of $\Delta P_1$ and $\Delta P_2$.

The invention also relates to a system for measuring fluid flow rate, the system comprising a device as described above and means for calculating the fluid flow rate by forming a linear combination of the pressure differences $\Delta P_1$ and $\Delta P_2$. Such a system may also include means for determining the density of the fluid. Means may be provided for determining the flow rate $Q_i$ ($i=1,2$) of the fluid in at least one of the two venturis on the basis of the pressure difference $\Delta P_i$, and also, optionally, means for comparing $Q_i$ and $Q$.

The invention also provides a method of measuring the flow rate of a fluid in a fluid passage in a well, using a device for a system as defined above, the method including the steps of:

measuring a first pressure difference $\Delta P_1$ across a first venturi section;

measuring a second pressure difference $\Delta P_2$ across a second venturi section; and calculating the flow rate from said values $\Delta P_1$ and $\Delta P_2$ measured during the two above steps, while eliminating the static component.

The distances between the two pressure take-off points of the two venturis are preferably equal. The same applies to the normal sections (and also the large sections) of the venturis.

The static component can be eliminated by a linear combination of $\Delta P_1$ and $\Delta P_2$.

The method may additionally include a step of calculating the static component.

Further, it may also include a step of determining the fluid flow direction in the passage, which method comprises the following sub-steps:

assuming a fluid flow direction;

determining, for said assumed direction, the flow rate $Q_i$ ($i=1,2$) of the fluid through at least one of the two venturis, on the basis of the pressure difference $\Delta P_i$;

comparing $Q$ and $Q_i$ to verify the assumption concerning the flow direction.

The pressure differences $(\Delta P_i)_j$ corresponding to different instants $t_j$ can be measured, and the corresponding data can be stored, optionally after being compressed, with the values $Q_j$ of flow rate at different instants $t_j$ being calculated subsequently.

This provides a data set $Q_j(t_j)$.

BRIEF DESCRIPTION OF THE DRAWINGS

In any event, the characteristics and advantages of the invention appear more clearly in the light of the following description. The description relates to embodiments given in non-limiting and explanatory manner, with reference to the accompanying drawings, in which.

DESCRIPTION OF THE INVENTION

Figure 1:
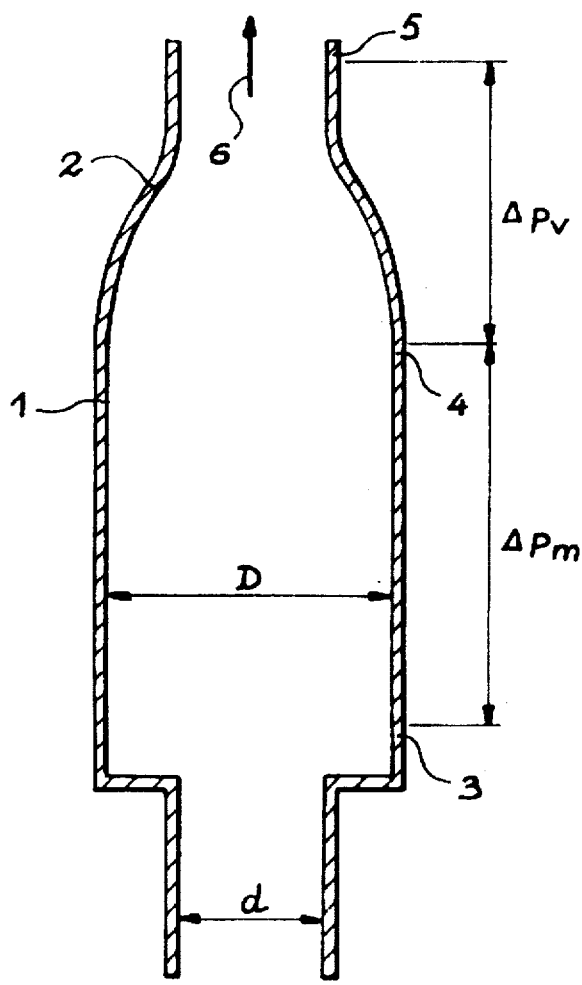
FIG. 1 shows a prior art flow rate measuring device.
Figure 2:
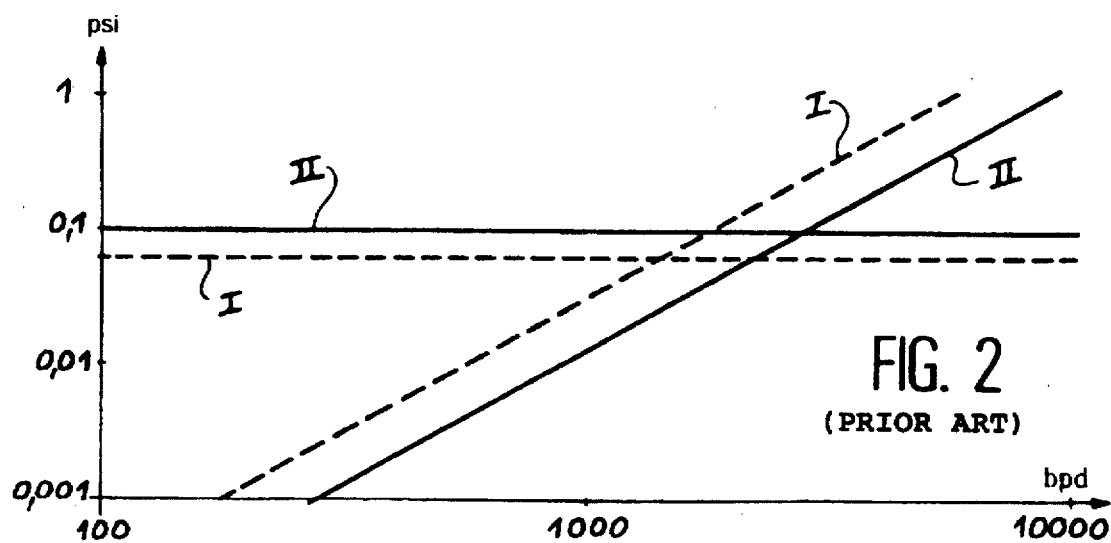
FIG. 2 shows the weights of the two components in a prior art differential pressure measurement.
Figure 3:
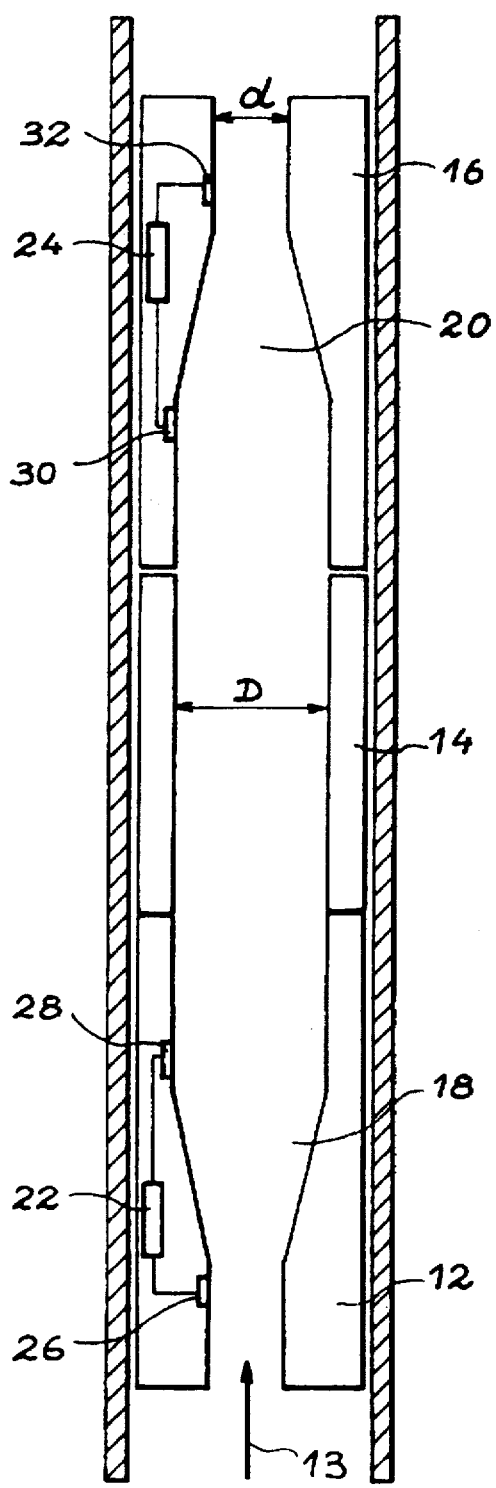
FIGS. 3 and 4 show two devices of the present invention.

A first embodiment of a device of the invention is shown in FIG. 3. In this figure, references 12, 14, and 16 represent different sections of the inside wall of a pipe string adapted for DST (DST=Drill Stem Test). These sections are of a string of production test rods (i.e., a pipe string adapted for DST (Drill Stem Test)). In a drill stem test, the diameter d is set at a nominal value of 2¼" (57.15 mm), whereas the diameter D of the central enlargement is 3" (76.2 mm). Thereafter, the fluid passes through a converging venturi 20: the wall tapers so the fluid goes from a section of diameter D to return to a section of diameter d. A differential pressure sensor 22 serves to measure the pressure difference between two pressure take-off points 26 and 28 situated upstream and downstream respectively from the diverging venturi 18. A differential pressure sensor 24 serves to measure the pressure difference between two pressure take-off points 30 and 32 situated respectively upstream and downstream from the converging venturi 20. The points 28 and 30 could equally well coincide.

Figure 4:
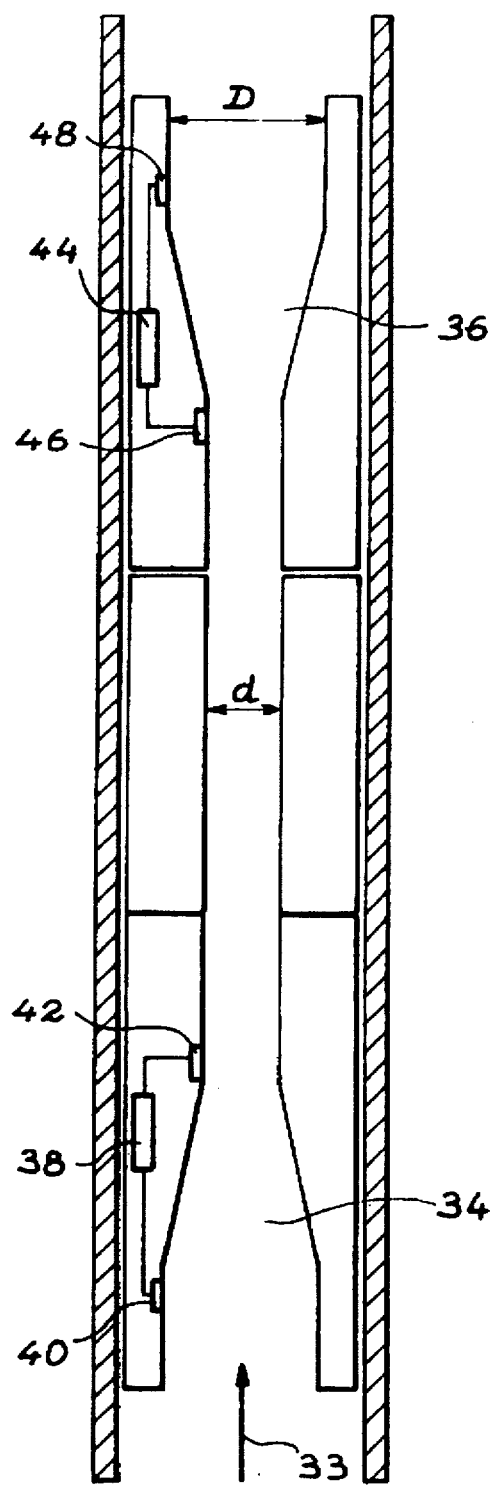

Another embodiment is shown in FIG. 4. The fluid, e.g. flowing in the direction represented by arrow 33 first passes through a converging venturi 34 whose wall defines a large section of diameter D (3", 76.2 mm) and a normal section of diameter d (2¼", 57.15 mm). A first differential pressure sensor 38 serves to measure the pressure difference between two pressure takeoff points 40 and 42 situated respectively at the inlet and at the outlet of the converging venturi 34, and a differential pressure sensor 44 serves to measure the pressure between two pressure take-off points 46 and 48 situated respectively at the inlet and at the outlet of the diverging venturi 36. In this case as well, the points 46 and 42 could coincide.

In both cases, the spacing (in the direction of flow) between the two pressure take-off points in one venturi is preferably equal to the spacing between the two pressure take-off points in the other venturi. However, the invention also extends to any embodiment in which these two spacings are different.

Likewise, the normal sections (or the large sections as the case may be) of the two venturis are preferably equal, but the invention also extends to the case where they are not equal.

In any event, the different pressure sensors 22, 24, 38, and 44 may be connected in a manner known to the person skilled in the art to means (not shown in the figures) enabling the data delivered by said sensors to be stored and/or operated on. In particular, when working a hydrocarbon well, such means may include computer means situated on the surface.

On the basis of the signals produced by the pressure sensors at various instants $t_j$, e.g. during a given test sequence, it is possible to obtain signals representative of the variation over time $Q(t)$ of the flow rate.

In the two cases shown in FIGS. 3 and 4, these same equations govern pressure variations between the inlets and the outlets of the venturis, and from the fluid flow point of view, the device presents the same advantages over the prior art. From the practical implementation point of view, the FIG. 4 device is easier to implement than the FIG. 3 device.

Consider the device shown in FIG. 3, the pressure $\Delta P_1$ measured between the points 26 and 28 is given by the following relationship:

$$\Delta P_1 = a_1 \rho_x v^2 + b(\rho_o - \rho_x) \quad (1)$$

Similarly, the pressure difference between the points 30 and 32 is given by the following relationship:

$$\Delta P_2 = a_2 \rho_x v^2 - b(\rho_o - \rho_x) \quad (2)$$

In the above equations, $\rho_x$ designates the density of the flowing fluid, $\rho_o$ designates the density of a reference oil present in the ducts of the differential sensors 22, 24 (or 38 and 44 for the embodiment shown in FIG. 4), and v designates the flow speed of the fluid. Also:

$$a_1 = k/Cd_1^2 \text{ and } a_2 = k/Cd_2^2$$

where $$k = \frac{1}{2g}\left(\frac{D^4}{d^4} - 1\right)$$

$Cd_1$ and $Cd_2$ being calibration coefficients for the venturis.

From the measured values of $\Delta P_1$ and $\Delta P_2$, it is possible to deduce the density and/or the flow speed of the fluid by the following relationships:

$$\rho_x = \rho_o + \frac{1}{2b}\left[\frac{a_1 - a_2}{a_1 + a_2}(\Delta P_1 + \Delta P_2) - (\Delta P_1 - \Delta P_2)\right] \quad (3)$$

and $$v^2 = \frac{1}{(a_1 + a_2)} \cdot \frac{(\Delta P_1 + \Delta P_2)}{\rho_x} \quad (4)$$

Relationship (4) gives the flow speed in the section of diameter D. The volume flow rate of the fluid is calculated using:

$$Q = \frac{1}{4}(\pi D^2 v) \quad (5)$$

From this equation system, it is possible to deduce various consequences relating to the characteristics of the double venturi device of the invention.

Firstly, the static component, although it is indeed present in each of equations (1) and (2), has opposite signs therein, so that it disappears completely when summing $\Delta P_1$ and $\Delta P_2$: consequently, whatever the flow rate, this component has no influence on the result.

It may be observed at this point that the above equations are given for the case where the spacing between the two pressure take-off points of one venturi is equal to the spacing between the two pressure take-off points of the other venturi. Otherwise (i.e. different spacings), the static component is not eliminated when summing $\Delta P_1$ and $\Delta P_2$, but it is eliminated when making a linear combination of $\Delta P_1$ and $\Delta P_2$ using coefficients in the combination that take the ratio of spacings into account.

The measurements $\Delta P_1$ and $\Delta P_2$ obtained with each of the sensors may also suffer from error or uncertainty associated with the sensors themselves. Nevertheless, compared with the gradio venturi measurement system, error associated with the sensor has much smaller influence on the final result. In the gradio venturi system, the error necessarily varies with $1/v$, i.e. in a manner that is inversely proportional to the flow rate. Using the dual venturi of the invention, the overall error depends on the sign of the error in each sensor: it may happen that an error is obtained which varies in a manner that is inversely proportional to flow rate (but in this case the error is nevertheless approximately five to ten times smaller than that of a gradio venturi), however it is also possible to obtain an error that is constant over the entire range of measured flow rates, particularly when the error on one of the sensors compensates the error on the other sensor. This possibility is mathematically impossible when using only one venturi.

Another advantage of a dual venturi device in accordance with the invention is that it makes it possible to achieve a very good estimate of the discharge coefficient over a wide range of flow rates. In a single venturi, the discharge coefficient is a function for which an analytical expression has not been rigorously established. Certain expressions make use of Stolz's equation, others are more empirical, but they all share in common the fact of using the Reynolds number. With venturi flow meters, the standard ISO-5167 provides a table which gives the approximate variation in discharge coefficient as a function of Reynolds number. That table is reproduced below as Table I.

TABLE I

| $R_E$ | Cd |
|---|---|
| $4 \times 10^4$ | 0.957 |
| $6 \times 10^4$ | 0.966 |
| $10^5$ | 0.976 |
| $1.5 \times 10^5$ | 0.982 |

In the field of hydrocarbon production, the measured flow rates lie in the range about 500 B/d to about 15,000 bpd (i.e. about 3.3 m³/h to 99 m³/h). For a flow rate of 1,000 bpd (6.6 m³/h, corresponding to a flow speed of about 0.7 meters per second (m/s)), a Reynolds number is calculated having a value of $R_E = 4 \times 10^4$, whereas for a rate of 10,000 bpd (66 m³/h, i.e. about 7 m/s), the Reynolds number as calculated is $R_E = 4 \times 10^5$. On comparison with above Table I, it can be deduced that the discharge coefficient Cd is not constant over the range of flow rates involved. The dual venturi device of the present invention makes it possible to overcome this difficulty since the equivalent discharge coefficient of the system as a whole can be given as being the root mean square of the discharge coefficients $Cd_1$ and $Cd_2$ of each of the venturis. More precisely, the equivalent discharge coefficient is given by:

$$(1/Cd_e) = \sqrt{(1/Cd_1^2) + (1/Cd_2^2)} \quad (6)$$

This results in attenuation of variations in the discharge coefficient over the entire range of flow rates of interest. Table II below gives the value of the discharge coefficient at two different flow rates (1,000 bpd and 10,000 bpd) respectively for a convergent venturi ($Cd_1$), a divergent venturi ($Cd_2$), and for a dual venturi system of the invention ($Cd_e$). The error given at the bottom of each column corresponds to the error obtained on flow rate when the discharge coefficient calculated for 10,000 bpd is applied to a small flow rate (1,000 bpd): this error drops to 2.5% for the dual venturi of the invention, whereas it is about 5% for the convergent venturi and is greater than 15% for the divergent venturi.

Consequently, the dual venturi of the invention makes it possible to use a single discharge coefficient over the entire range of flow rates of interest.

TABLE II

|  | $Cd_1$ | $Cd_2$ | $Cd_e$ |
|---|---|---|---|
| 1,000 bpd (6.6 m³/h) | 0.95 | 1.43 | 0.785 |
| 10,000 bpd (66 m³/h) | 0.988 | 1.21 | 0.765 |
| ERROR | 5.1% | 15.4% | 2.5% |

Because the discharge coefficients of a convergent venturi and of a divergent venturi are not the same, a density measurement performed with a device of the invention suffers from an interfering component that is proportional to the sum of the signals from the two sensors ($\Delta P_1 + \Delta P_2$), which is itself proportional to the square of the speed of the fluid (see equations 3 and 4 above). Consequently, the error in determining the discharge coefficient for each venturi shows up in the density, and this effect increases with increasing fluid flow speed. This means that the improvement in flow rate determination is obtained at the price of reduced accuracy concerning density.

In order to remedy this drawback, it is possible to determine density at low flow rates (e.g. at a zero flow speed), and subsequently to use the density value obtained in this way for determining the flow speed at higher flow rates.

Another method of compensating for said loss of accuracy concerning flow rate consists in adding a differential pressure sensor in a section that has no change of diameter (e.g. between points 28 and 30 in FIG. 3 or between points 42 and 46 in FIG. 4), thereby directly measuring the static component independently of the flow speed of the fluid: this makes it possible to obtain simultaneously very good density measurement and good flow rate measurement.

Because of the symmetrical configuration of the dual venturi in a device of the present invention, fluid may flow through it in either direction, and the flow speed can be determined under all circumstances. In particular, the invention is also applicable to injection wells. This is not possible with the prior art gradioventuri structure in which the convergent venturi must extend in the fluid flow direction.

Conversely, the device of the invention can be used to determine fluid flow direction. This can be particularly advantageous under transient conditions, e.g. after a valve has been closed. It is possible to proceed as follows:

it is assumed that the fluid is flowing in a particular direction, e.g. the direction indicated by arrow 13 (or 33) in FIG. 3 (or FIG. 4);

thereafter the values of $\Delta P_1$ and $\Delta P_2$ are measured and the flow speed and the density are deduced therefrom using equations (3) and (4);

equation (1) is used to deduce the flow speed $v_1$ through the venturi 18 (a diverging venturi if the fluid is flowing in the direction 13), and from the value of the density $\rho$ and the differential pressure $\Delta P_1$; it may be assumed that $Cd_1=1$;

equation (2) is used to deduce the fluid flow speed $v_2$ through the venturi 20 (a convergent venturi if the fluid is flowing in the direction 13), on the basis of the density $\rho$ and the differential pressure $\Delta P_2$; it may be assumed that $Cd_2=1$;

if the fluid is indeed traveling in the direction indicated by arrow 13 (FIG. 3), then the following must apply:

$v_1 > v$ and $v_2 > v$;

otherwise, $v_1 < v$ and $v_2 < v$, which means that the venturi 18 is convergent in the present fluid flow direction whereas the venturi 20 is divergent, and consequently the fluid is flowing in the opposite direction to that given by arrow 13 (or arrow 33). Density must then be recalculated, assuming fluid flow in the opposite direction. The value for flow speed is then corrected to take account of the new value for the density.

All of the methods described above, and in particular the methods of calculating flow rate and/or density of a fluid, or the method of determining fluid flow direction, can be implemented using suitably programmed computer means of appropriate type; for example, when working hydrocarbons, these means may be the means that are situated on the surface and that have already been mentioned in the description above.

Finally, the invention has been described in its application to a hydrocarbon well. The measurement devices and methods described are not limited to applications of that type, and the invention can be applied to measuring fluid flow in any non-horizontal passage (when the flow is horizontal, there is no static component).

We claim:

1. A device for measuring the flow rate Q of a fluid in a fluid passage, in a well, the device comprising a first venturi section and first means responsive to a pressure difference $\Delta P_1$ across the first venturi section between two points that are separate from each other in the flow direction, and a second venturi section and second means responsive to a pressure difference $\Delta P_2$ across the second venturi section between two points that are separate in the flow direction, the two venturi sections being disposed relative to each other in such a manner that for a given direction of fluid flow, the diameter of one of them increases whereas the diameter of the other one of them decreases, said venturi sections being further arranged in such a way that the static pressure components present in said pressure differences $\Delta P_1$ and $\Delta P_2$ can be cancelled out.

2. A measurement device according to claim 1 wherein the distances between the two pressure take-off points of the two venturis are equal.

3. A device according to claim 1 in which the normal sections of the two venturis are equal.

4. A device according to claim 2 in which the normal sections of the two venturis are equal.

5. A device according to claim 1 in which the large sections of the two venturis are equal.

6. A device according to claim 2 in which the large sections of the two venturis are equal.

7. A measurement device according to claim 1 in which each of the first and second venturi sections is constituted by a locally thicker portion of the wall defining the outside of the passage.

8. A device according to claim 1 further including means for measuring the pressure difference between two points of a portion of the passage in which there is no variation in diameter.

9. A device according to claim 1 in which the well is fitted with a string of production test rods, the two venturi sections being fixed in said string of rods.

10. A device according to claim 9, in which recording means are provided in the string of rods to record signals representative of $\Delta P_1$ and $\Delta P_2$.

11. A method of determining the flow rate Q of a fluid in a fluid passage in a well, comprising the steps of:

measuring a pressure difference $\Delta P_1$ obtained across a first venturi section between two points that are separate from each other in the fluid flow direction;

measuring a pressure difference $\Delta P_2$ obtained across a second venturi section between two points that are separate from each other in the flow direction;

the two venturi sections being disposed relative to each other in such a manner that for a given fluid flow direction the diameter of one of them increases while the diameter of the other decreases; and determining the flow rate Q by combining and deriving $\Delta P_i$ (i=1,2) in such a manner that the static pressure components present in the pressure difference measurements $\Delta P_i$ cancel out.

12. A method according to claim 11 wherein the distance in the flow direction between the two points of the first venturi section is equal to the distance between the two points of the second venturi section.

13. A method according to claim 11 in which the normal sections of the two venturis are equal.

14. A method according to claim 12 in which the normal sections of the two venturis are equal.

15. A method according to claim 11 in which the large sections of the two venturis are equal.

16. A method according to claim 11 in which the static pressure component is eliminated by a linear combination of $\Delta P_1$ and $\Delta P_2$.

17. A method according to claim 16 in which the linear combination of $\Delta P_1$ and $\Delta P_2$ is the sum of $\Delta P_1$ and $\Delta P_2$.

18. A method according to claim 11 further including a step of calculating the static pressure component.

19. A method according to claim 11 further including a step of determining the fluid flow direction and comprising the following sub-steps:

assuming a fluid flow direction;

determining, for said assumed direction, the flow rate $Q_i$ (i=1,2) of the fluid through at least one of the two venturis, on the basis of the pressure difference $\Delta P_i$;

comparing Q and $Q_i$ to verify the assumption concerning the flow direction.

20. A method according to 11 in which the pressure differences $(\Delta P_i)_j$ corresponding to different instants $t_j$ are measured, with the corresponding data being stored, optionally after being compressed, and with flow rate values $Q_j$ for different instants $t_j$ being calculated subsequently.

* * * * *